(12) United States Patent
Nagarajan (10) Patent No.: US 8,494,281 B2
(45) Date of Patent: Jul. 23, 2013

(54) AUTOMATED METHOD AND SYSTEM FOR RETRIEVING DOCUMENTS BASED ON HIGHLIGHTED TEXT FROM A SCANNED SOURCE

(75) Inventor: Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1187 days.

(21) Appl. No.: 11/476,981

(22) Filed: Jun. 26, 2006

(65) Prior Publication Data
US 2007/0253643 A1 Nov. 1, 2007

Related U.S. Application Data

(63) Continuation-in-part of application No. 11/414,053, filed on Apr. 27, 2006.

(51) Int. Cl.
*G06K 9/46* (2006.01)

(52) U.S. Cl.
USPC ............ 382/190; 382/305; 358/403; 715/748

(58) Field of Classification Search
USPC ........ 382/305, 190; 707/3; 358/403; 715/748
See application file for complete search history.

(56) References Cited

U.S. PATENT DOCUMENTS

| | | | | |
|---|---|---|---|---|
| 4,760,606 A | * | 7/1988 | Lesnick et al. ................. | 382/306 |
| 6,166,826 A | * | 12/2000 | Yokoyama .................... | 358/1.16 |
| 6,408,316 B1 | * | 6/2002 | Himmel et al. ................ | 715/206 |
| 6,744,938 B1 | * | 6/2004 | Rantze et al. ................. | 382/312 |
| 7,715,032 B2 | * | 5/2010 | Bird et al. ..................... | 358/1.15 |
| 2001/0053252 A1 | * | 12/2001 | Creque ......................... | 382/305 |
| 2003/0169449 A1 | * | 9/2003 | Iida .............................. | 358/1.15 |
| 2004/0071362 A1 | | 4/2004 | Curry et al. ................... | 382/274 |
| 2004/0190773 A1 | * | 9/2004 | Messer et al. ................. | 382/182 |
| 2005/0275897 A1 | | 12/2005 | Fan et al. ....................... | 358/2.1 |
| 2006/0072830 A1 | | 4/2006 | Nagarajan et al. ............ | 382/224 |

OTHER PUBLICATIONS

Sergey Brinn, "The anatomy of a large-scale hypertextual Web search engine", Computer Networks and ISDN Systems 1998.*

* cited by examiner

*Primary Examiner* — Chan S Park
*Assistant Examiner* — Mark Roz
(74) *Attorney, Agent, or Firm* — Kermit D. Lopez; Luis M. Ortiz; Tuesday A. Kaasch (57) ABSTRACT

An automated method and system for retrieving documents based on highlighted text from a scanned source. Documents that are stored within a multifunction device can be searched and retrieved using highlighted text as keyword. The search of such documents can further be extended towards other networked multifunction devices and also to retrieve information available on the Internet using highlighted text as a uniform resource locator pointer. The matched documents and their respective details are then displayed on a graphical user interface which provides the user with multiple actions to be taken with respect to the documents.

15 Claims, 6 Drawing Sheets

AUTOMATED METHOD AND SYSTEM FOR RETRIEVING DOCUMENTS BASED ON HIGHLIGHTED TEXT FROM A SCANNED SOURCE

RELATED PATENT APPLICATIONS

This application is a Continuation-In-Part (CIP) under 25 U.S.C. §120 of U.S. patent application Ser. No. 11/414,053, filed on Apr. 27, 2006, and incorporated herein by reference in its entirety.

TECHNICAL FIELD

Embodiments are generally related to data processing methods and systems. Embodiments are also related to methods and systems for retrieving documents based on highlighted text from a scanned source. Embodiments are additionally related to the retrieval of information related to the highlighted text.

BACKGROUND OF THE INVENTION

A continuing need exists for highlighting information on pages in order to emphasis such information. Thus, for example, a major market exists for highlight markers. Marker emphasis is simple and visual in nature. In the legal industry, for example, highlighted text from legal briefs can be used to form new documents. An attorney may mark a document with colors demonstrating the "pros" and "cons" of a particular case for both the defendant and prosecution. Administration support is typically responsible for transcribing the highlighted portions of the document and then searching through a document repository for related information.

Often, it is desirable to differentiate between regions of a document which have been "highlighted" with, for example, a highlighter pen, from regions of a document which have not been highlighted. The term "highlighted" as utilized herein is intended to mean marks in a document that have been differentiated from remaining marks by a region which has a substantially different gray scale than the background or marks of the original document. Such marks can be made, for example, by way of well known "Hi-Liter" pens, "Major Accent" pens, and other pens which produce bright but relatively transparent colors.

Electronic storage of documents has facilitated the handling of large volumes of documents, such as those handled by hospitals, universities, government institutions, and the like. Typically, the documents are entered into massive storage systems by use of a scanner system that converts text into electronic data. Once the documents are stored, there is a need to retrieve selected documents, or selected pages from the documents. For example, a hospital may choose to maintain all patient charts in a computer storage system, while possessing the ability to selectively "call up" a document for viewing and editing.

Existing systems typically address the need for selectively retrieving a document by assigning an index to the document as it is entered into storage. The index may be system-generated or based on a user-defined code. The code is then stored together with the document. To retrieve a document, a user must enter the appropriate code associated with the desired document. Other systems use predetermined key words extracted from the document, which the user may then use to subsequently retrieve a document. The problem encountered with such systems is that a user must know the index, or code, associated with a desired document. If a user enters an inappropriate index or code, then the target document may not be retrieved.

In an effort to address the foregoing difficulties, it is believed that the ability to automatically retrieve documents based on highlighted text as discussed in greater detail herein can address many of the problems with traditional document retrieval methods and systems. It is believed that the implementation of an improved method and system as disclosed herein can reduce additional time and effort spent in the retrieval of documents.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved data processing methods and systems.

It is another aspect of the present invention to provide for a method and system for retrieving documents based on highlighted text from a scanned source.

It is an additional aspect of the present invention to retrieve information available on a computer network, wherein such information is related to and/or associated with the highlighted text.

The aforementioned aspects and other objectives and advantages can now be achieved as described herein. A computer implemented method and system are disclosed for retrieving documents based on highlighted text from a scanned source. Documents that are stored within a multi-function device can be automatically searched and retrieved using highlighted text as keyword(s) or as an URL pointer. The matched documents are then displayed in the context of a graphical user interface that provides the user with multiple actions to be taken with respect to the document(s).

The search of keywords can further be extended toward other networked multifunction devices and also to retrieve information available from the Internet. Once a set of documents are selected, the user is provided with a choice to print, sent to network through e-mail, or fax those documents to remote destinations. Based on the user selection, subsequent dialog boxes can be presented, if necessary for the user to type in the e-mail address and/or fax number to send and render such documents.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Figure 1:
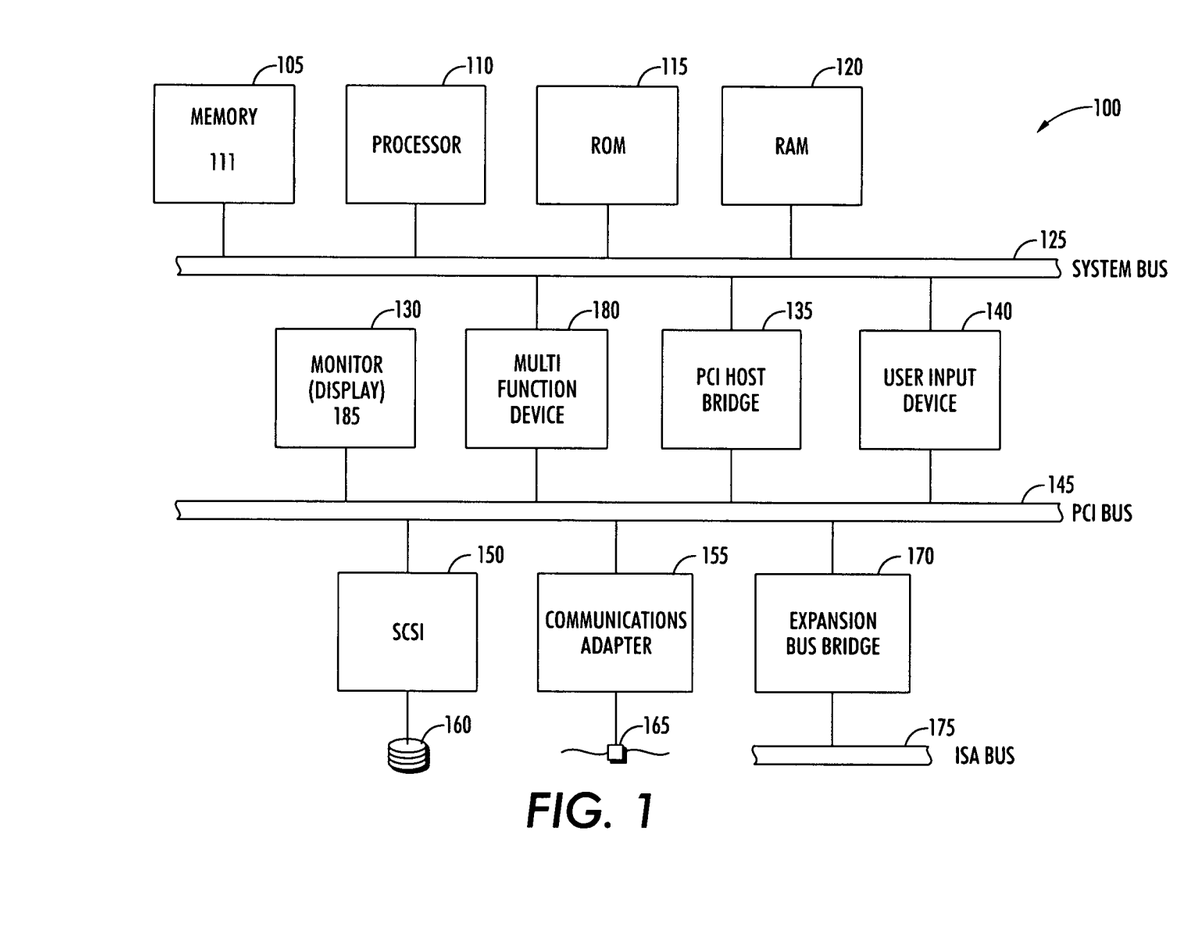
FIG. 1 illustrates a block diagram of data-processing system, which can be utilized for retrieving documents based on highlighted text from scanned source, in accordance with a preferred embodiment.

Referring to the drawings and in particular to FIG. 1, there is depicted a data-processing apparatus 100 which can be utilized for retrieving documents based on highlighted text in accordance with a preferred embodiment. As shown in FIG. 1, a memory 105, a processor (CPU) 110, a Read-Only memory (ROM) 115, and a Random-Access Memory (RAM) 120 are generally connected to a system bus 125 of apparatus 100. Memory 105 can be implemented as a ROM, RAM, a combination thereof, or simply a general memory unit. Module 111 can be stored within memory 105 and then retrieved and processed via processor 110 to perform a particular task.

A user input device 140, such as a keyboard, mouse, or another pointing device, can be connected to PCI (Peripheral Component Interconnect) bus 145. A multifunction device 180 can be provided, which can combine several core technologies, including image scanning, document printing, fax signaling, and so forth into a single unit. The multifunction device 180 is generally connected to PCI bus 145.

Data-processing system thus includes CPU 110, ROM 115, and RAM 120, which are also coupled to Peripheral Component Interconnect (PCI) local bus 145 of data-processing apparatus 100 through PCI host-bridge 135. PCI Host Bridge 135 provides a low latency path through which processor 110 may directly access PCI devices mapped anywhere within bus memory and/or input/output (I/O) address spaces. PCI Host Bridge 135 also provides a high bandwidth path for allowing PCI devices to directly access RAM 120.

Also attached to PCI local bus 145 are communications adapter 155, small computer system interface (SCSI) 150, and expansion bus-bridge 170, communications adapter 155 is utilized for connecting data-processing apparatus 100 to a network 165. SCSI 150 is utilized to control high-speed SCSI disk drive 160. Expansion bus-bridge 170, such as a PCI-to-ISA bus bridge, may be utilized for coupling ISA bus 175 to PCI local bus 145. Note that PCI local bus 145 can further be connected to a monitory 130, which functions as a display (e.g., a video monitor) for displaying data and information for a user and for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

Figure 2:
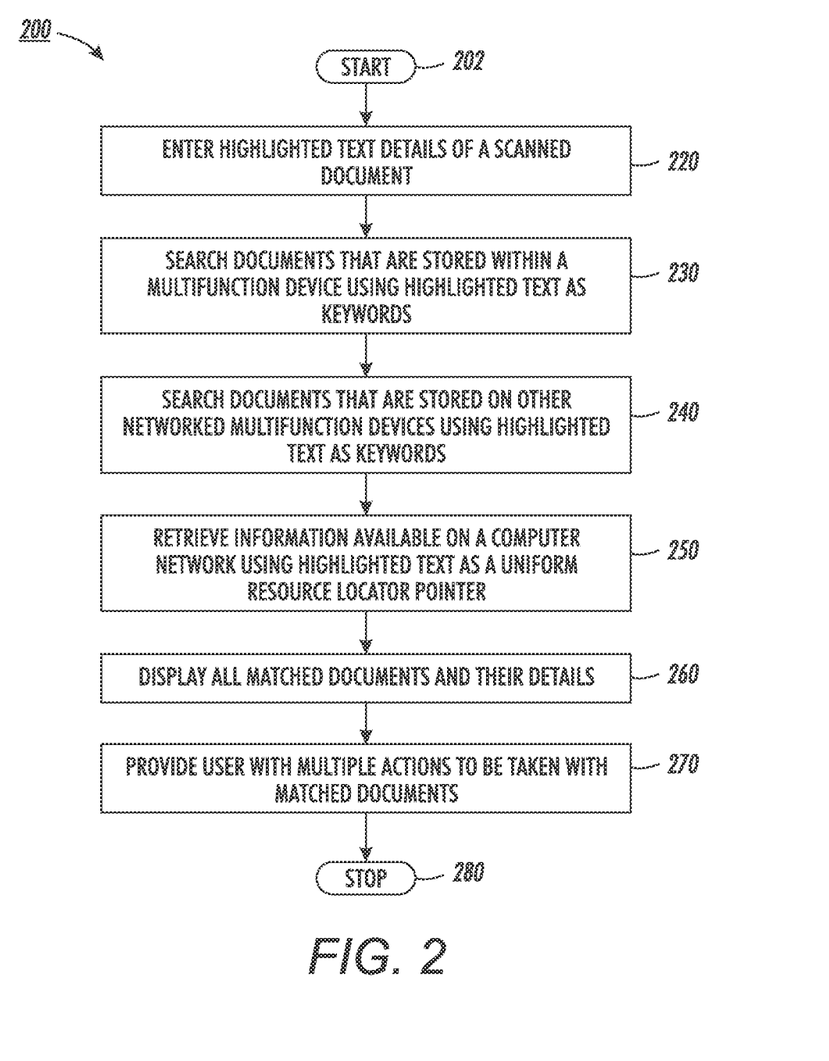
FIG. 2 illustrates a high level flow chart of operations depicting logical operational steps for retrieving documents based on highlighted text from a scanned source, in accordance with a preferred embodiment.

Referring to FIG. 2, a high level flow chart of a method 200 is illustrated, which describes logical operational steps for retrieving documents based on highlighted text from a scanned source, in accordance with a preferred embodiment. Note that the process or method 200 described in FIG. 2 can be implemented in the context of a software module such as module 111 of apparatus 100 depicted in FIG. 1. The process depicted in FIG. 2 can be initiated, as indicated at block 210. Thereafter, as depicted at block 220, highlighted textual details from a scanned document can be entered into a GUI such as GUI 185 depicted in FIG. 1. As described next at block 230, scanned documents stored within a multifunction device can be searched using the highlighted text as a keyword(s).

Similarly, searching can be performed on other multifunction devices using highlighted text as keyword(s), as depicted at block 240. By using highlighted text as a uniform resource locator pointer, information available on a computer network such as the Internet can be retrieved, as illustrated at block 250. Next, matched documents and their respective details can be displayed within a GUI (e.g., GUI 185 of FIG. 1), as described at block 260. Multiple actions to be taken with the matched documents can then be provided to the user, as indicated at block 270. The process can then terminate, as indicated at block 280.

Figure 3:
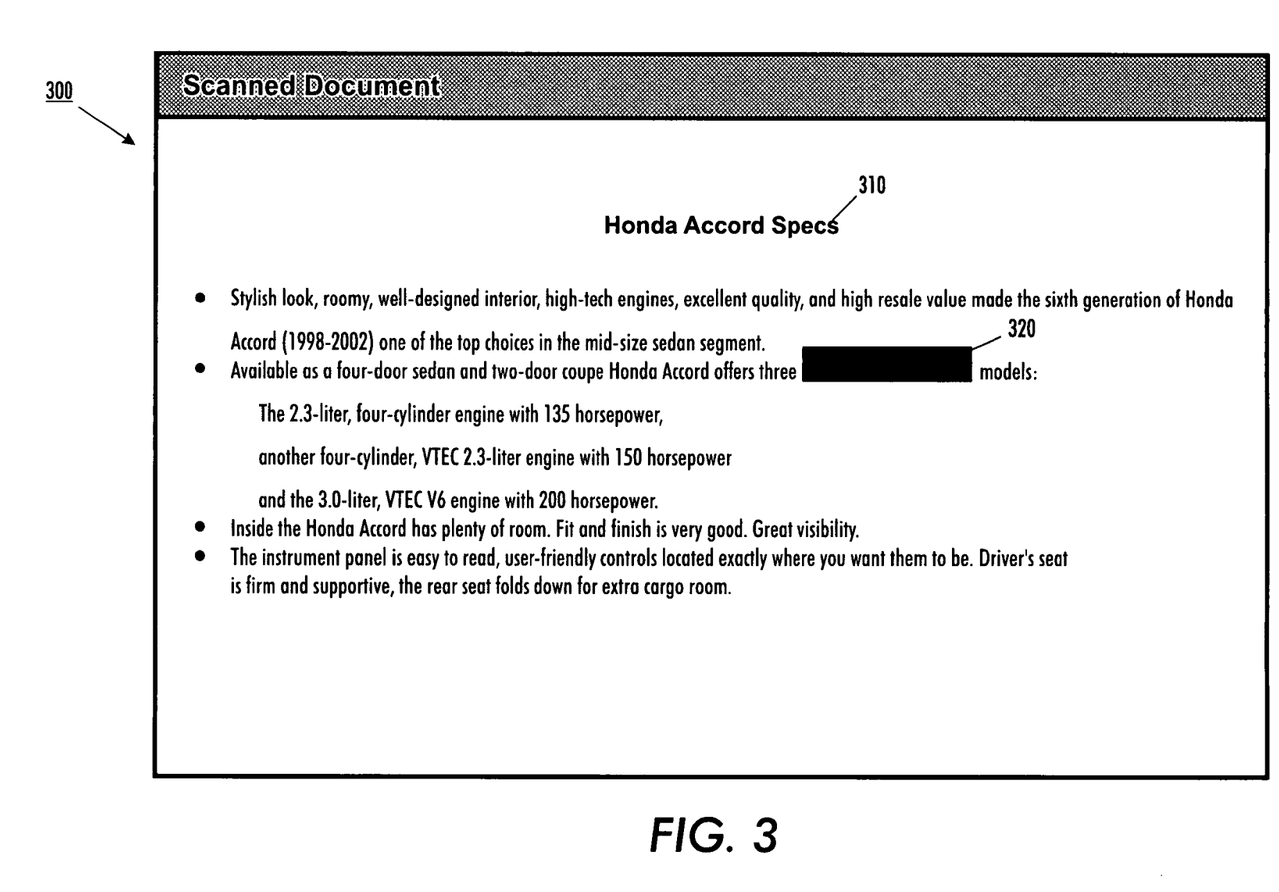
FIG. 3 illustrates an example of a scanned document with highlighted text which can be utilized for retrieving documents, in accordance with a preferred embodiment.

Referring to FIG. 3 an example scanned document 300 with highlighted text is illustrated, which can be utilized for retrieving documents, in accordance with a preferred embodiment. In the example depicted in FIG. 3, the scanned document 300 generally contains textual data 310 labeled as "Honda Accord Specs". The scanned document 300 also contains highlighted text 320 of the words "engine dynamic". Recall that the term "highlighted" is intended to mean that first marks in a document have been differentiated from remaining marks of the document by a region which has a substantially different gray scale than the background or marks of the original document. Such marks can be made, for example, utilizing devices such as the well known "Hi-Liter" pens, "Major Accent" pens, and other pens or marks that produce bright but relatively transparent colors.

Figure 4:
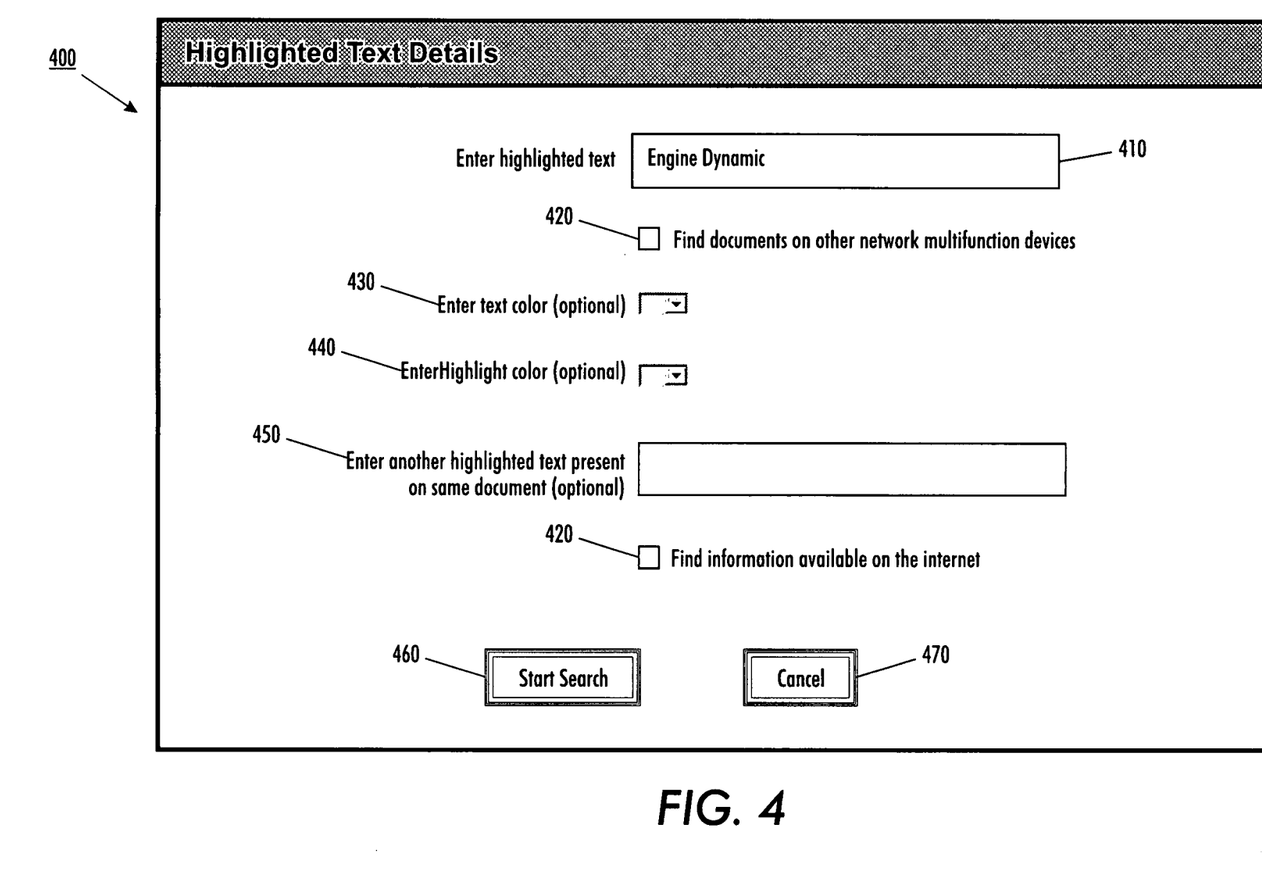
FIG. 4 illustrates a graphical user interface window for entering highlighted text details from a scanned source, in accordance with a preferred embodiment.

Referring to FIG. 4, a GUI window 400 is illustrated, which a user can interact with to enter highlighted text details from a scanned source in order to retrieve documents, in accordance with a preferred embodiment. Note that GUI window 400 can be implemented utilizing a GUI such as the GUI 185 depicted in FIG. 1 and can be provided by a module, such as, for example, module 111. GUI window 400 can be displayed via a display device such as monitor 130 depicted in FIG. 1 and implemented via the GUI 185. Note that a GUI window 400 as utilized herein generally constitutes a portion of a monitor screen that contains its own document or message. The highlighted text details on scanned documents can be entered in field 410 of GUI window 400.

Documents located at other networked multifunction devices and/or information available through the Internet can be retrieved by "clicking" the check box 420 within GUI window 400. Note that a check box such as check box 420 is a GUI element that indicates a two-way choice or state (e.g., true/false) which can be edited by the user. Normally, check boxes are graphically displayed on a display screen or monitor in the shape of a square box that contains white space (for false) or a tick mark (for true). Normally adjacent to the check box is a displayed caption that describes the meaning of the check box. Inverting the state of a check box can be accomplished by "clicking" the button or the caption with the user input device 140 (e.g., a mouse or a keyboard shortcut).

Different options can be provided for a user by window 400, including fields, 430, 440 and 450, which respectively permit a user to define highlighted text details such as text color, highlight color, and highlight other details present in the same document. Upon filling in such details, the user can search for documents by "clicking" the start search button 460, which results in searching of scanned documents stored in a multifunction device (e.g., device 180 of FIG. 1) using the highlighted text as a keyword(s) or as an uniform resource locator pointer. The user can simply cancel the search by "clicking" the graphically displayed cancel button 470 included within window 400.

Figure 5:
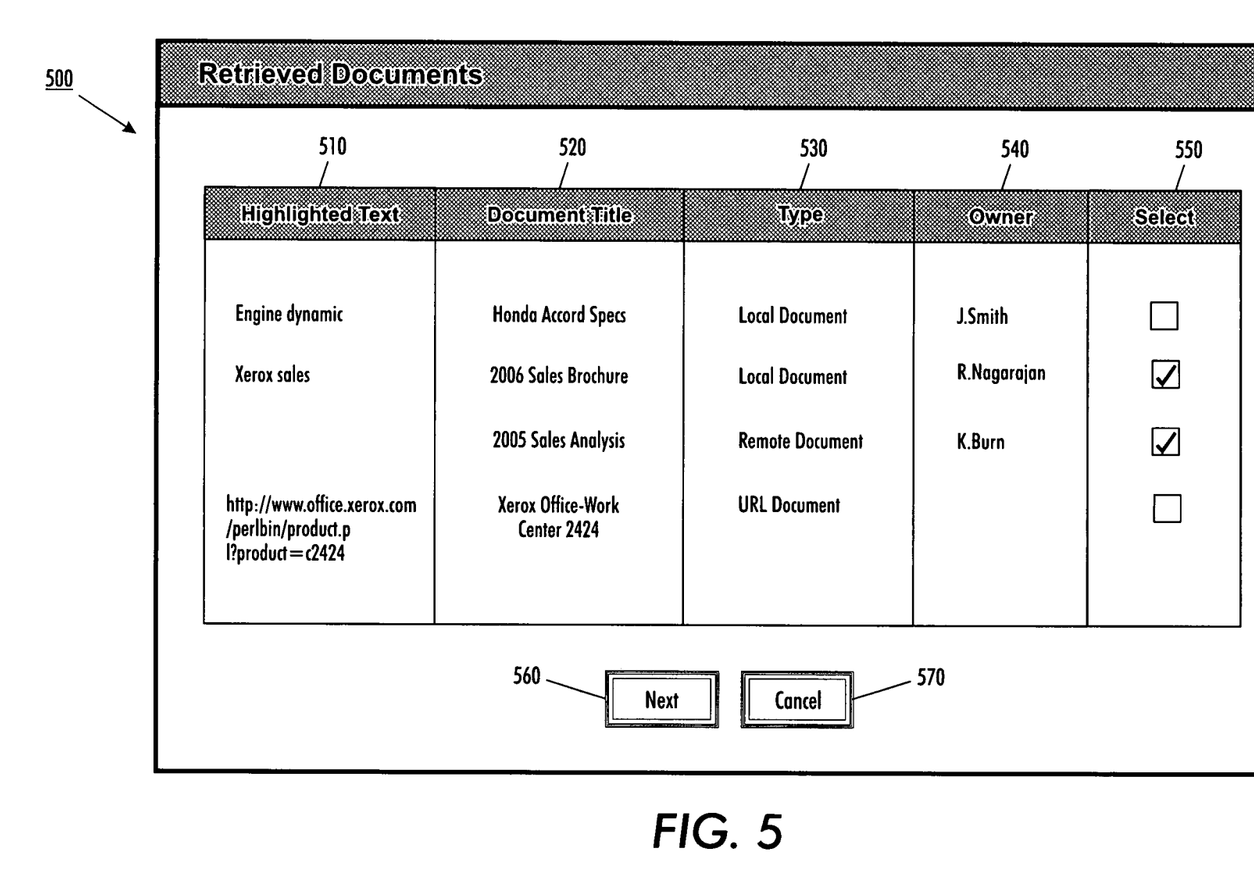
FIG. 5 illustrates a graphical user interface window that displays information concerning retrieved documents and their details, in accordance with a preferred embodiment.

Referring to FIG. 5, a GUI window 500 which summarizes retrieved documents and their details is illustrated, in accordance with a preferred embodiment. The GUI window 500 can be implemented utilizing a GUI such as the GUI 185 depicted in FIG. 1 The retrieved document data indicated in GUI window 500 can include document details such as highlighted text 510 that is entered in a highlighted text details field 410 of GUI window 400 illustrated in FIG. 4. Window 500 also displays an area 520 that references a document title, and an area 530 that indicates the type of document 530. GUI window 500 also includes an area 540 that includes document owner information associated with particular stored documents. A selection section 550 is also displayed within GUI window 500, which permits a user to select other documents and/or document data by "checking" one or more graphically displayed click boxes. By selecting one of these check boxes, a user can select particular documents. Upon a selection of a desired document(s), the user can move to the next GUI window by clicking the next button 560. Alternatively, the user may simply cancel the present job by "clicking" the graphically displayed cancel button 570.

Figure 6:
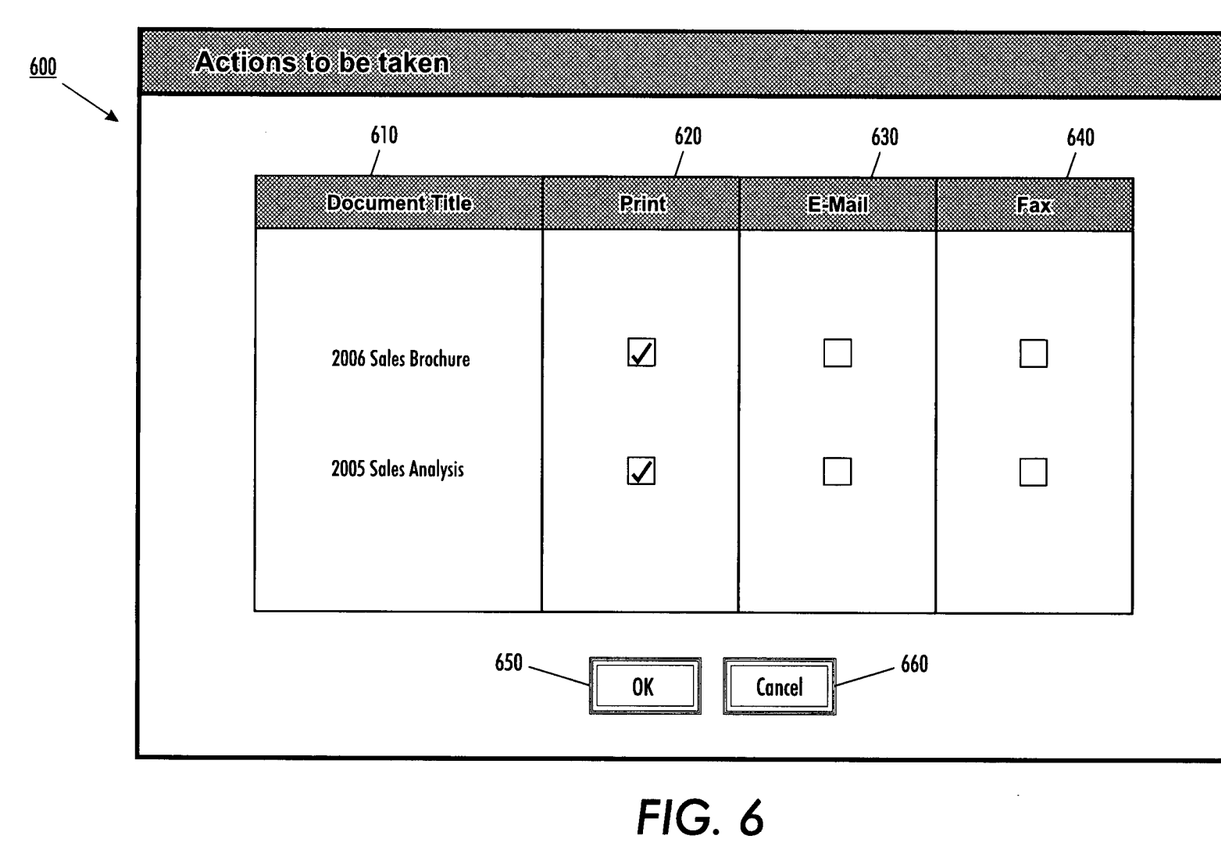
FIG. 6 illustrates a graphical user interface window that permits user to take particular actions with respect to the retrieved documents, in accordance with a preferred embodiment.

Referring to FIG. 6, a GUI window 600 is illustrated, which indicates actions that can be taken with respect to retrieved documents, in accordance with an alternative embodiment. GUI window 600 includes four graphically displayed sections 610, 620, 630, and 640. Section 610 lists particular document titles, while sections, 620, 630 and 640 display check boxes. The actions to be taken generally include the ability to select a particular document title displayed within section 610 (i.e., "Document Title") and then initiate a print, e-mail and/or a fax of a selected document title. The user is provided with a choice to print (see section 620) the document, send the document through a network utilizing e-mail (see section 630), and/or send the document to remote destinations by a fax (see section 640). Each action is initiated with an appropriately displayed check box that the user selects. Upon selection, a subsequent dialog box can be presented, if necessary, for the user to type in the e-mail address and/or fax number to send the documents through the multi function device by clicking the ok button 650 displayed within GUI window 600. The user can also cancel the present job by "clicking" the graphically displayed cancel button 660.

Based on the foregoing it can be appreciated that a system can be provided, through the use of one or more software modules as described above, which results in the retrieval of documents based on highlighted text from a scanned document. The method of document retrieval described herein addresses many of the problems with traditional document retrieval. The main advantage of this method is that it displays all matching documents on the graphical user interface display and provides the user with different options to render the documents. The search of highlighted text as keyword could further be extended to look on other multi function devices and/or information that are available on the Internet. Time is also saved because there is no need for administration support to transcribe highlighted portions of documents and then search through the document repository for related information.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method for retrieving documents based on highlighted text from a scanned source, comprising:

scanning a document comprising highlighted text;

displaying a first graphical user interface (GUI) window comprising fields for entering details of said highlighted text;

searching a plurality of documents available from a network utilizing said highlighted text and said details of said highlighted text as keywords to identify matched documents containing said keywords;

displaying said matched documents and details associated with each of said matched documents within a second GUI window comprising check boxes to allow individual selection of at least one of said matched documents;

displaying a third GUI window comprising four sections, wherein a first section displays document titles of said selected matched documents, a second section displays an email check box, a third section displays a fax check box and a fourth section displays a print check box to allow selection of at least one action to be performed with respect to each of said selected matched documents, wherein a first action is selected for a first document and a second action, different from said first action, is selected for a second document of said matched documents, wherein said entering details of said highlighted text further comprises entering text color, highlight color, additional text present, and sources to be searched.

2. The computer implemented method of claim 1 wherein said details of said highlighted text are utilized as a uniform resource locator pointer to locate matching documents on the internet.

3. The computer implemented method of claim 1 wherein a summary of said matched documents comprises document title, type of document and ownership of said document.

4. The computer implemented method of claim 1 further comprising displaying a dialog box for entering an e-mail address upon selection of said e-mail check box.

5. The computer implemented method of claim 1 further comprising displaying a dialog box for entering a fax number upon selection of said fax check box.

6. A computer system for retrieving documents based on highlighted text from a scanned source, comprising:
a data-processing apparatus;
a multi-function device operably connected to said data-processing apparatus; and
a module executed by said data-processing apparatus, said module and said data-processing apparatus being operable in combination with one another to:
receiving a scanned document comprising highlighted text from said multifunction device;
displaying a first graphical user interface (GUI) window comprising fields for entering details of said highlighted text;
searching a plurality of documents available from a network utilizing said highlighted text and said details of said highlighted text as keywords to identify matched documents containing said keywords;
displaying said matched documents and details associated with each of said matched documents within a second GUI window comprising check boxes to allow individual selection of at least one of said matched documents; and
displaying a third GUI window comprising four sections, wherein a first section displays document titles of said selected matched documents, a second section displays an email check box, a third section displays a fax check box and a fourth section displays a print check box associated with each of said selected matched documents to allow selection of at least one action to be performed with respect to each of said selected matched documents, wherein a first action is selected for a first document and a second action, different from said first action, is selected for a second document of said matched documents, wherein said entering details of said highlighted text further comprises entering text color, highlight color, additional text present, and sources to be searched.

7. The system of claim 6 wherein said details of said highlighted text are utilized as a uniform resource locator pointer to locate matching documents on the internet.

8. The system of claim 6 wherein a summary of said matched documents comprises document title, type of document and ownership of said document.

9. The system of claim 6 further comprising displaying a dialog box for entering an e-mail address upon selection of said e-mail check box, 10. The system of claim 6 further comprising displaying a dialog box for entering a fax number upon selection of said fax check box.

11. A non-transitory program product residing in a computer for retrieving documents based on highlighted text from a scanned source, comprising:
instruction media residing in a computer for receiving a scanned document comprising highlighted text;
instruction media residing in a computer for displaying a first graphical user interface (GUI) window comprising fields for entering details of said highlighted text;
instruction media residing in a computer for searching a plurality of documents available from a network utilizing said highlighted text and said details of said highlighted text as keywords to identify matched documents containing said keywords;
instruction media residing in a computer for displaying said matched documents and details associated with each of said matched documents within a second GUI window comprising check boxes to allow individual selection of at least one of said matched documents;
instruction media residing in a computer for displaying a third GUI window comprising four sections, wherein a first section displays document titles of said selected matched documents, a second section displays an email check box, a third section displays a fax check box and a fourth section displays a print check box associated with each of said selected matched documents to allow selection of at least one action to be performed with respect to each of said selected matched documents, wherein a first action is selected for a first document and a second action, different from said first action, is selected for a second document of said matched documents, wherein said entering details of said highlighted text further comprises entering text color, highlight color, additional text present, and sources to be searched.

12. The program product of claim 11 wherein said details of said highlighted text are utilized as a uniform resource locator pointer to locate matching documents on the internet.

13. The program product of claim 11 wherein a summary of said matched documents comprises document title, type of document and ownership of said document.

14. The program product of claim 11 further comprising displaying a dialog box for entering an e-mail address upon selection of said e-mail check box, 15. The program product of claim 11 further comprising displaying a dialog box for entering a fax number upon selection of said fax check box.

* * * * *